United States Patent [19]

Elgue et al.

[11] Patent Number: 5,133,949
[45] Date of Patent: Jul. 28, 1992

[54] PROCESS AND DEVICE FOR THE REMOVAL OF $H_2S$

[75] Inventors: Jean Elgue, Billere; Jacques Tournier-Lasserve, Pau, both of France

[73] Assignee: Societe Nationale Elf Acquitaine (Production), Courbevoie, France

[21] Appl. No.: 465,067
[22] PCT Filed: May 18, 1989
[86] PCT No.: PCT/FR89/00240
§ 371 Date: Jan. 19, 1990
§ 102(e) Date: Jan. 19, 1990
[87] PCT Pub. No.: WO89/11326
PCT Pub. Date: Nov. 30, 1989

[30] Foreign Application Priority Data

May 20, 1988 [FR] France ............... 88 06797

[51] Int. Cl.$^5$ ............................................. C01B 17/16
[52] U.S. Cl. .................... 423/220; 423/228; 55/73; 422/168
[58] Field of Search ............. 423/220, 226, 228, 229, 423/230, 231, 573.1; 55/73; 422/168; 261/152

[56] References Cited

U.S. PATENT DOCUMENTS 4,308,243 12/1981 Castel ................... 423/220
4,452,763 6/1984 van de Kraats .......... 423/229
4,869,884 9/1989 Riggs ..................... 423/229

FOREIGN PATENT DOCUMENTS 2930522 2/1981 Fed. Rep. of Germany ...... 423/242

OTHER PUBLICATIONS

European Patent Application 0,124,835 by Edwards Nov. 14, 1984.

Primary Examiner—Gary P. Straub
Assistant Examiner—Timothy C. Vanoy
Attorney, Agent, or Firm—Weiser & Stapler

[57] ABSTRACT

Process for removing hydrogen sulfide at low concentration in a gas containing water vapor. The gas is cooled to a temperature below the dew point of water, which condenses and separates the water. The dry gas is scrubbed free of hydrogen sulfide by an $H_2S$-absorbent solvent forming a purified gas. The purified gas is contacted and rehydrated with heated water so that the water content as water vapor corresponds to a mass flow rate of water substantially equal to the mass flow rate of the water present in the $H_2S$-containing gas before cooling. The condensed water circulates in a closed circuit to contact and rehydrate the purified gas, and then is cooled to the appropriate temperature for cooling the $H_2S$-containing gas. An apparatus, appropriate for carrying out the process is disclosed.

32 Claims, 5 Drawing Sheets

FIG_1

FIG_2

FIG_4

PROCESS AND DEVICE FOR THE REMOVAL OF H₂S

The invention relates to a process for the removal of H$_2$S present at low concentration in a gas which also contains a large quantity of water vapour. It also relates to a device for making use of this process.

Gases containing H$_2$S at low concentration, namely in a concentration ranging from 10 volumes per million to 10% by volume, and also containing a quantity of water vapour ranging from 5 to 60% by volume are frequently encountered in industry. This is particularly the case with certain residue gases and especially residue gases of a sulphur plant, which have been subjected to a hydrogenation and hydrolysis treatment to bring all the sulphur compounds which they contain into the single H$_2$S form, or else synthetic gases which are obtained, for example, by hydrogenation or cracking of carbonaceous products such as coal, wood or petroleum residues Such gases are generally subjected to a treatment for the removal of the H$_2$S which they contain either, when synthesis gas is involved, to prevent this compound from perturbing the synthesis reactions in which these gases are to take part, or, in the case of residue gases, to bring these gases within the standards imposed by legislation concerning atmospheric pollution before they are discharged into the atmosphere.

In a known process (FR-A-2,101,724), which is employed for the treatment of residual gases orieinating from a Claus sulphur plant and which primarily comprises stage of hydrogenation and hydrolysis of sulphur compounds other than H$_2$S which are present in the said residue gases to bring these sulphur compounds into the single form of H$_2$S, the gas stream resulting from the said hydrogenation and hydrolysis stage, which has an H$_2$S content of less than 5% by volume and water vapour concentration of the order of 30% by volume, is cooled to a temperature below the dew point of the water which it contains, to condense virtually all this water. The water-free gas stream is then scrubbed countercurrentwise, be operating at a temperature below 50° C., with a regenerable solvent binding H$_2$S, for example an aqueous solution of a secondary or tertiary alkanolamine, and the scrubbed gas stream is then subjected to an incineration to convert into SO$_2$ the last traces of H$_2$S which it may still contain, and is then discharged into the atmosphere.

In a process of this kind, the water condensed during the stage of cooling the hydrogenated gas stream is an acidic water saturated with H$_2$S, which must undergo a specific purification treatment to be capable of being reemployed in the process or discharged as waste water, a treatment of this kind being complex and by the same token costly, especially because of the large volumes of water to be treated.

To avoid the disadvantages due to the condensation of water, reference FR-A-2,425,886 proposes to do away with this condensation by permanently maintaining the temperature of the gas stream at all points of the plant at a value above the dew point of the water contained in the said gas stream.

When operating in this way, it is necessary for the contact between the hydrogenated gas stream and the regenerable solvent to be brought about at higher temperatures, namely between 65° C. and 85° C., and, furthermore, all the water vapour is present in the gas stream when this contact takes place. These operating conditions result in the use of a markedly higher solvent flow rate, namely approximately three times more, to obtain the same degree of removal of H$_2$S.

In the process of reference FR-A-2,449,470, the stage of condensation of the water contained in the gas stream to be treated originating from the hydrogenation is maintained, before the said gas stream is brought into contact with the regenerable solvent, but the condensed water is injected into the circuit of the said solvent and the temperature of this solvent is adjusted to a suitable value of the order of 70° C. when it is injected into the zone for bringing into contact with the gas stream containing H$_2$S, to bring about an equilibrium in the overall water balance of the said zone so as to avoid any discharge of liquid water.

In such a form of application, the flow rates of regenerable solvent to be employed to obtain the desired degree of removal of H$_2$S are comparable to those which must be employed in the process of reference FR-A-2,425,886.

The invention proposes a process for the removal of H$_2$S present at low concentration, namely 10 v.p.m. (volumes per million) to approximately 10% by volume, in a gas also containing 5 to 60% by volume of water vapour and possibly other gases such as CO$_2$. Like the process of reference FR-A-2,101,724, a process of this kind comprises a separation by condensation of the water contained in the gas to be treated, followed by bringing the gas to be treated, freed from its water, into contact with a regenerable solvent binding H$_2$S, but it does not require any purification treatment of the condensed water and therefore makes it possible to get rid of the disadvantages connected with such a treatment In addition, the process according to the invention also makes it possible to avoid the high solvent circulation flow rates which are necessary in the variants described in references FR-A-2,425,886 and 2,449,470, to obtain a comparable H$_2$S removal.

The process according to the invention is of the type in which the gas to be treated is cooled to a temperature below the dew point of the water which it contains so as to separate from the said gas by condensation, virtually all its water and the cooled gas, rid of its water, is scrubbed with an absorbent liquid binding H$_2$S and regenerable to form an absorbent liquid charged with H$_2$S, which is regenerated and reemployed, and a purified gas substantially free from water and from H$_2$S, and it is characterized in that the said purified gas is brought into contact with a sufficient quantity of water which contains the water produced during the cooling of the gas to be treated and optionally other waste waters and which is heated to an appropriate temperature higher than that of the purified gas, so as to produce a rehydrated purified gas whose temperature is such that the quantity of water which it contains corresponds to a mass flow rate of water substantially equal to the mass flow rate of the water present in the gas to be treated, before the latter is cooled, and of the optionally added waste waters.

The process according to the invention makes it possible to treat various gases which contain H$_2$S at low concentration, namely 10 v.p.m. to approximately 10% by volume and more particularly 50 v.p.m. to approximately 6% by volume, as well as a quantity of water vapour ranging from 5 to 60% by volume and more particularly from 10 to 50% by volume, it being possible for the said gases also to contain other acidic compounds such as $CO_2$. The gases to be treated may consist particularly of certain natural gases, of synthetic gases produced, for example, by hydrogenation or cracking of carbonaceous products such as coal, wood or petroleum residues, or else consisting of residue gases. The said process is applicable more particularly to the treatment of residual gases from sulphur plants operating in accordance with the Claus process, after the said residue gases have undergone a hydrogenation and hydrolysis treatment to bring all the sulphur compounds which they contain into the single form of $H_2S$, the said hydrogenation and hydrolysis treatment being carried out as described, for example in French Patent No. 85/15,905 (publication no. 2,589,141) of 25 Oct. 1985. The temperature of the gases to be treated may range, for example, from approximately 30° C. to approximately 150° C., while its pressure, which is generally that at which this gas is available, may range from atmospheric pressure to approximately 50 bars.

The water used to rehydrate the purified gas circulates in a closed circuit, the said circuit being fed with the condensed water produced during the cooling of the gas to be treated and optionally with waste water from other sources and giving up water to the purified gas when the latter is rehydrated.

As indicated above, the temperature of the water in the said circuit is adjusted upstream of the rehydration zone, that is to say the zone where the water is brought into contact with the purified gas to be rehydrated, to a value higher than that of the said gas and sufficient for the rehydrated purified gas, as it leaves the rehydration zone, to contain a quantity of water corresponding to a mass flow rate of water substantially equal to the mass flow rate of the water present in the gas to be treated, before the latter is cooled, and of the optionally added waste waters.

Cooling of the gas to be treated below the dew point of the water which it contains may be carried out in any known manner. It is possible, in particular, to perform this cooling by direct or indirect heat exchange with the water of the purified gas rehydration circuit, as it leaves the rehydration zone and after it has been cooled to the appropriate temperature.

The absorbent liquid employed in the scrubbing stage to bind the $H_2S$ present in the cooled gas, which is substantially rid of its water, may be chosen from the various liquids which absorb $H_2S$ and which are regenerable, especially by heating. The absorbent liquid may be based on one or more solvents which act physically, such as methanol, polyethylene glycol dimethyl ether, N-methylpyrrolidone, sulpholane, phosphoric esters, or else may consist of a chemically acting solvent consisting of an aqueous solution of one or more compounds binding acidic gases such as $H_2S$ in the form of thermally unstable complexes or salts, such as, for example, an aqueous solution of one or more alkanolamines such as methyldiethanolamine, triethanolamine, diisopropanolamine, monoethanolamine, diethanolamine, diglycolamine and stearically hindered amines. The absorbent liquid may also be chosen from mixtures of two abovementioned types of solvent such as, for example, mixtures of water, diisopropanolamine and sulpholane, mixtures of water, methyldiethanolamine and sulpholane and mixtures of water, methanol and one or more amines such as methyldiethanolamine, monoethanolamine, diethanolamine and diisopropanolamine. When the gas to be treated contains in addition to $H_2S$, other acidic gases and especially $CO_2$, the absorbent liquid is preferably chosen from those of the absorbent liquid like those mentioned above, which absorb $H_2S$ selectively. Most especially suitable as an absorbent liquid which is selective for $H_2S$ and regenerable by heating is an aqueous solution of an alkanolamine chosen particularly from methyldiethanolamine, triethanolamine and diisopropanolamine or of an amine chosen from certain stearically hindered amines, the alkanolamine or hindered amine concentration of this solution being, for example, between 1N and 8N and preferably lying between 3N and 6N.

The scrubbing of the cooled gas using the absorbent liquid is carried out in a scrubbing zone in which the gas to be scrubbed and the absorbent liquid preferably circulate countercurrentwise.

The pressure prevailing in the scrubbing zone corresponds substantially to that of the gas to be scrubbed injected into the said zone. The temperature to be chosen to perform the scrubbing, which depends inter alia on the nature of the absorbent liquid employed for binding the $H_2S$, lies below the dew point of the water in the gas to be treated. This scrubbing temperature is generally below 70° C. and, when the absorbent liquid is chosen from aqueous alkanolamine solutions, it is advantageously between 5° C. and 55° C. The temperature prevailing in the scrubbing zone corresponds substantially to that of the absorbent liquid introduced into the said zone.

Regeneration of the absorbent liquid charged with $H_2S$ can be carried out by decompression, by stripping with an inert gas and/or by heating, depending on the nature of the absorbent liquid, the operating conditions for applying the chosen regeneration technique being those recommended in the art for the technique in question.

A device for making use of the process according to the invention comprises a system for cooling the gas to be treated, which is provided with a delivery conduit for the gas to be treated and which also has an exit for the gases and an exit for the liquids, a scrubbing column which has an overhead exit for the gases, an entry for the regenerated absorbent liquid in its upper part and, in its lower part an exit for the charged absorbent liquid and a gas entry, the latter being connected to the gas exit of the cooling system, and a regeneration column which has an overhead exit for an acidic gas stream, an exit for the regenerated absorbent liquid at the bottom, this exit being connected by a conduit to the absorbent liquid entry of the scrubbing column, and, in its upper part, an entry for the charged absorbent liquid, the said entry being connected by a conduit to the corresponding exit of the scrubbing column, and it is characterized in that it also comprises, on the one hand, a rehydration column which has a gas exit overhead, a liquid entry in its upper part and in its lower part a liquid exit and a gas entry, this entry being in communication with the gas exit of the scrubbing column, and, on the other hand, a rehydration water circuit having one end connected to the liquid exit of the rehydration column and another end connected to the liquid entry of this column, the said circuit being combined with the cooling system so that, on the one hand, the water condensed by the cooling of the gas to be treated flows via the liquid exit of the cooling system. into the rehydration circuit and that, on the other hand, the rehydration water of this circuit may be heated by heat exchange with the gas to be treated, the rehydration water circuit being also provided with means for ensuring the circulation and the cooling of the water which it contains, these means being arranged between the exit of the rehydration column and the cooling system, and optionally means for introducing waste waters According to an embodiment, the system for cooling the gas to be treated comprises an indirect heat exchanger and a condensation flask which has an entry and is provided with a gas exit and a liquid exit, the said exits constituting the gas and the liquid exits of the cooling system respectively, one of the circuits of the indirect heat exchanger forming part of the rehydration water circuit while the other circuit of the said exchanger connects the delivery conduit for the gas to be treated to the entry of the condensation flask.

According to another embodiment, the cooling system consists of a cooling column which is provided with a gas exit and a liquid entry in its upper part and with the delivery conduit for the gas to be treated and a liquid exit in its lower part, the said gas and liquid exits forming the gas and the liquid exits, of the cooling system respectively, the said cooling column being mounted in the rehydration water circuit via its liquid entry and exit. In an alternative form of this embodiment, the cooling column is equipped with an indirect heat exchange apparatus comprising an entry and an exit and whose entry forms the liquid entry of the said cooling column, the said apparatus being mounted via its entry and exit in the rehydration water circuit.

The cooling and rehydration columns may also constitute two superposed and independent sections of the same single column, namely a cooling section supporting a rehydration section, it being possible for the cooling section to have either of the structures defined above for the cooling column.

In another embodiment, the cooling, scrubbing and rehydration columns form three superposed sections of the same single column, namely a lower cooling section, an intermediate scrubbing section and an upper rehydration section, so that the gas exit of one section coincides with the gas entry of the section situated immediately above, the cooling section having either of the structures defined above for the cooling column and being connected to the rehydration water circuit as indicated for the said column.

The columns or sections of the device according to the invention in which a direct gas-liquid contact is produced are generally provided with trays or with a packing of any known type, which are intended to improve the gas/liquid contact. The number of trays or the height of the packing of the column or section in question is chosen so that the said column or section may have the desired operating performance.

Other characteristics and advantages will appear on reading the description of the forms of application of the process according to the invention, which is given below with reference to the figures of the attached drawing, in which.

Figure 1:
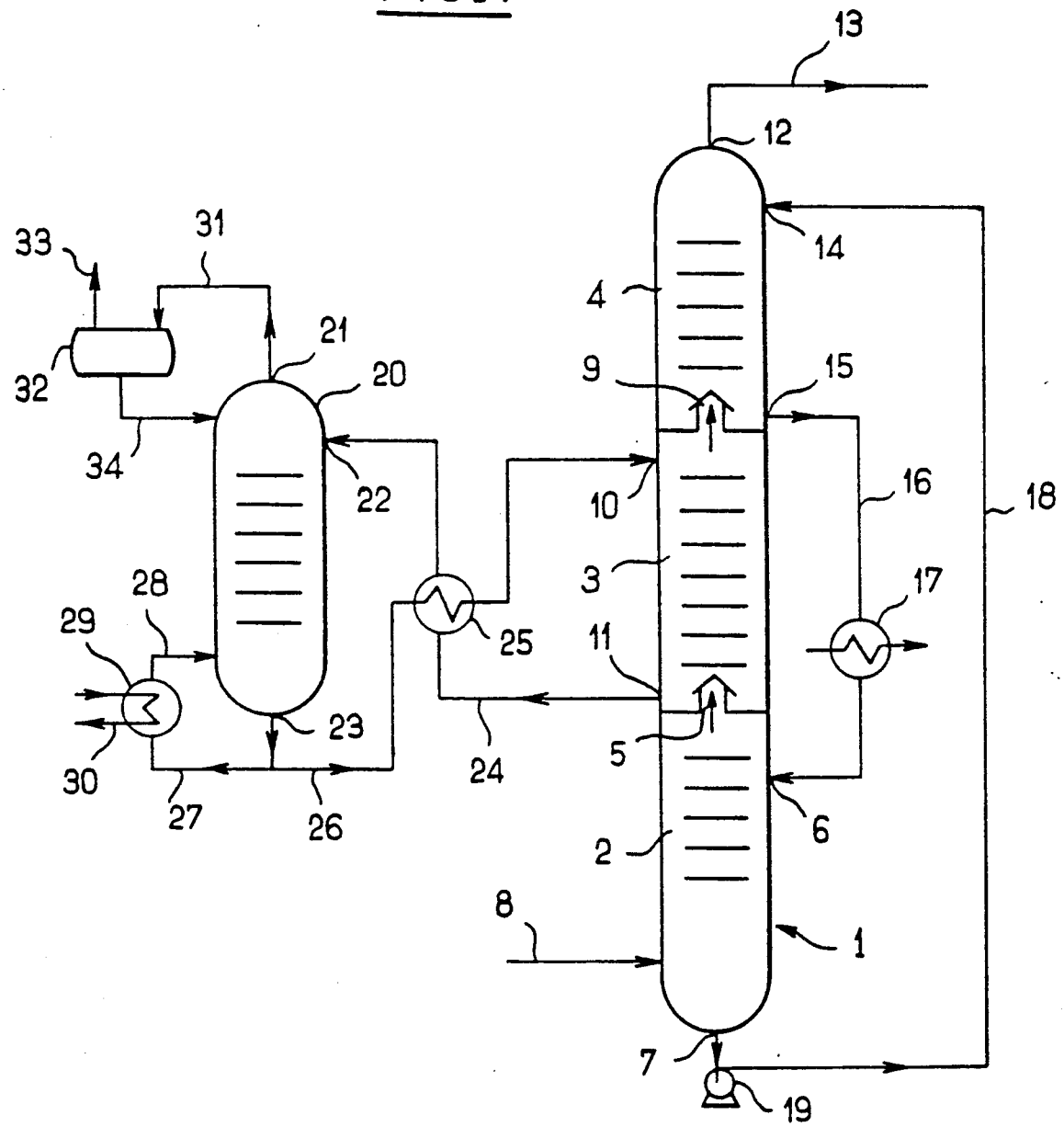
FIGS. 1 and 2 show two alternative forms of a first device according to the invention comprising the cooling, scrubbing and rehydration sections in the same single column.
Figure 2:
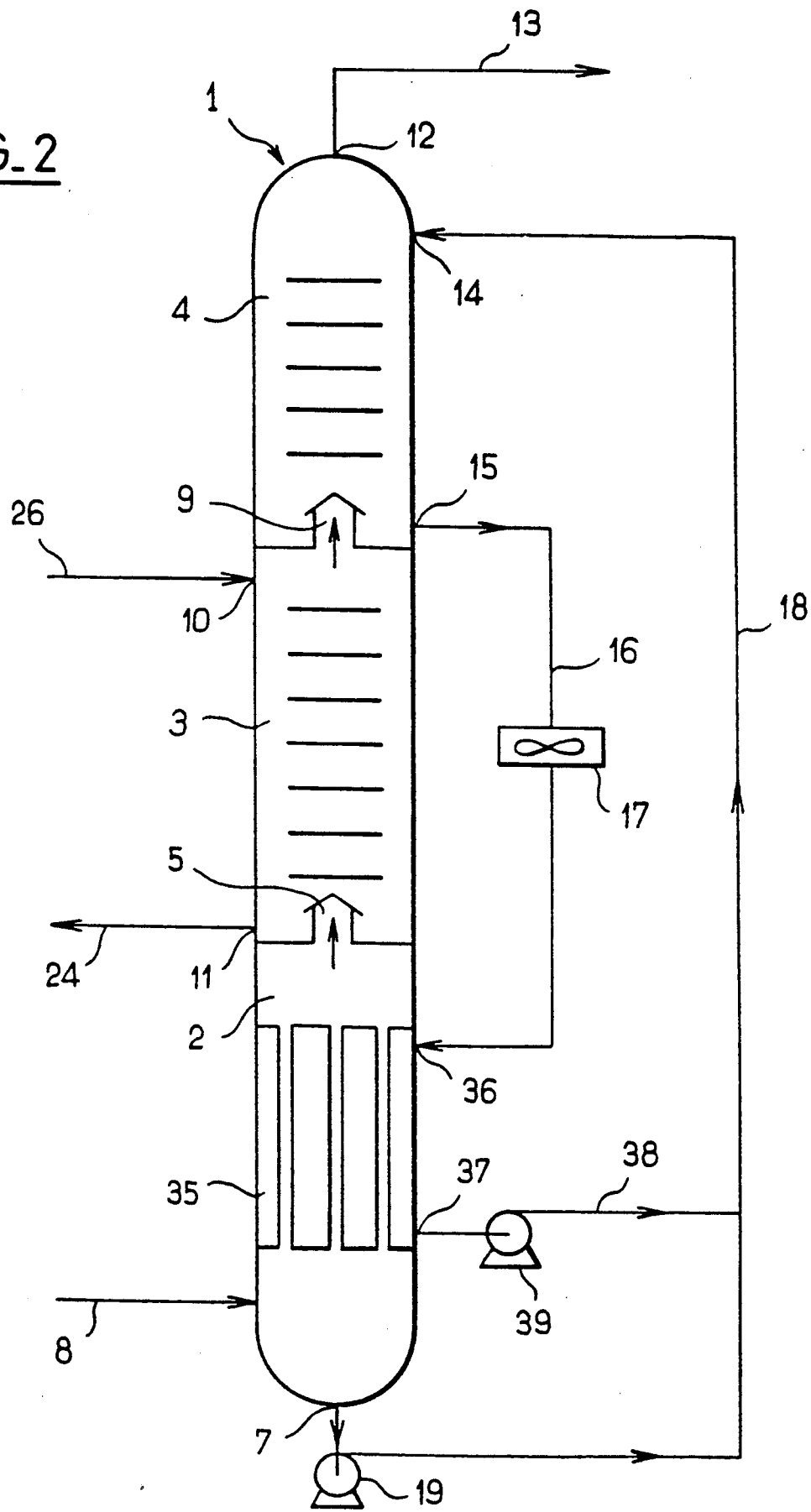

The device shown in FIG. 1 comprises a column 1 divided into three sections, namely a lower cooling section 2, an intermediate scrubbing section 3 and an upper rehydration section 4, each of the said sections being provided with trays for gas-liquid contact. Cooling section 2 communicates with the scrubbing section 3 via a passage 5 for the gases, the said passage forming the overhead gas exit of the cooling section and at the same time the entry for the gases at the bottom of the scrubbing section, and the scrubbing section 3 communicates with the rehydration section 4 via a passage 9 for the gases, the said passage forming at the same time the overhead gas exit of the scrubbing zone and the gas entry situated in the lower part of the rehydration section. Cooling section 2 comprises, moreover, an entry 6 for the liquids in its upper part and an exit 7 for the liquids at its bottom and, in addition, a delivery conduit 8 for the gas to be treated opens into the lower part of the said section. Scrubbing section 3 also comprises an entry 10 for the regenerated absorbent liquid in its upper part and an exit 11 for the charged absorbent liquid in its lower part. The rehydration section 4 has an overhead gas exit 12 extended by a gas removal conduit 13, a liquid entry 14 in its upper part and a liquid exit 15 in its lower part. Cooling section 2 is mounted via its liquid entry 6 and exit 7 in a rehydration water circuit which comprises, on the one hand, a conduit 16 provided with an indirect heat exchanger 17 and connecting the liquid exit 15 of the rehydration section to the liquid entry 6 of the cooling section and, on the other hand, a conduit 18 connecting the liquid exit 7 of the cooling section to the liquid entry 14 of the rehydration section. The conduit 18 is provided with a pump 19 whose delivery is directed towards the entry 14 of the rehydration section. A regeneration column 20, combined with the scrubbing section 3, comprises an exit 21 for an acidic gas overhead, an entry 22 for the absorbent to be regenerated in its upper part and an exit 23 for the regenerated absorbent at the bottom. The entry 22 of the regeneration column is connected to the exit 11 of the scrubbing section via a conduit 24, in which is mounted the cold circuit of an indirect heat exchanger 25. The exit 23 of the regeneration column is connected to the entry 10 of the scrubbing section via a conduit 26 on which the hot circuit of the heat exchanger 25 is mounted. In addition, the regeneration column is connected in its lower part via entry 27 and exit 28 pipes to a reboiler 29 heated by indirect heat exchange by means of steam circulating in a pipe 30. In addition, the exit 21 of the regeneration column is connected via a pipe 31 to a condenser 32, which is provided, in its upper part, with a conduit 33 for removal of acidic gas and whose lower part is connected to the upper part of the regeneration column by a conduit 34 ensuring the return of the condensates The device of FIG. 2 shows an alternative form of the device shown diagrammatically in FIG. 1. In this alternative form, the elements which are identical with the elements of the device of FIG. 1 are indicated by the same reference signs. In relation to the device of FIG. 1, the cooling section 2 of the device of FIG. is no longer fitted with trays for gas/liquid contact, but is equipped internally with an apparatus 35 for cooling by indirect heat exchange, the said apparatus 35 having a liquid entry 36, forming the liquid entry of the cooling section 2 and connected to the liquid exit 15 of the rehydration section 4 by the conduit 16, equipped with an air cooler by way of heat exchanger 17, and a liquid exit 37 connected to the conduit 18 by a conduit 38 in which there is mounted a pump 39 whose delivery is directed towards the conduit 18. In addition, as in the case of the device of FIG. 1, the liquid entries 10 and exit 11 of the scrubbing section 3 are connected, by the conduits 26 and 24 respectively, to the liquid exit 23 and entry 24 of a regeneration column 20, not shown and identical with that shown diagrammatically in FIG. 1.

Figure 3:
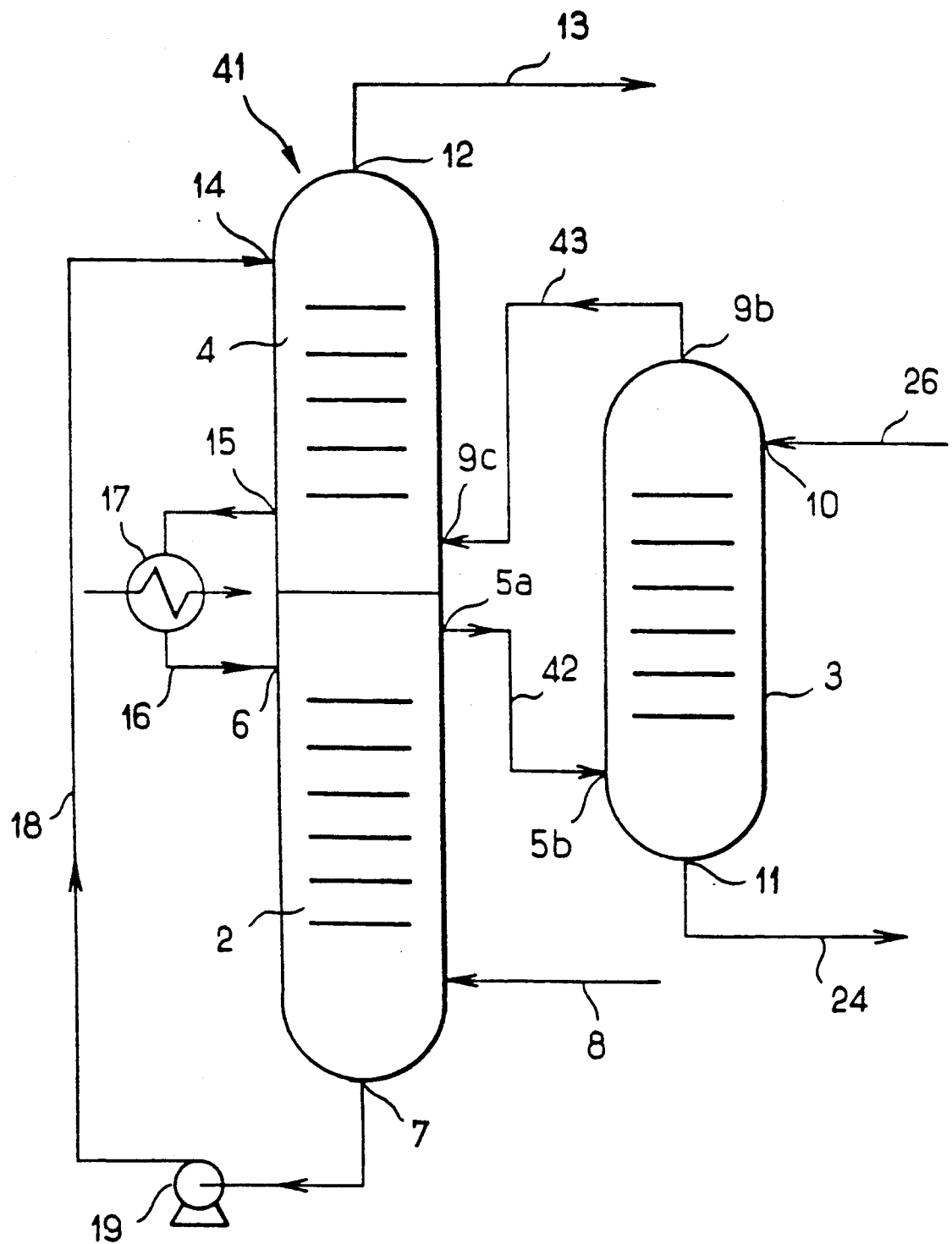
FIGS. 3 and 4 show two alternative forms of a second device according to the invention comprising the cooling and rehydration sections in the same single column and the scrubbing section in a separate column.
Figure 4:
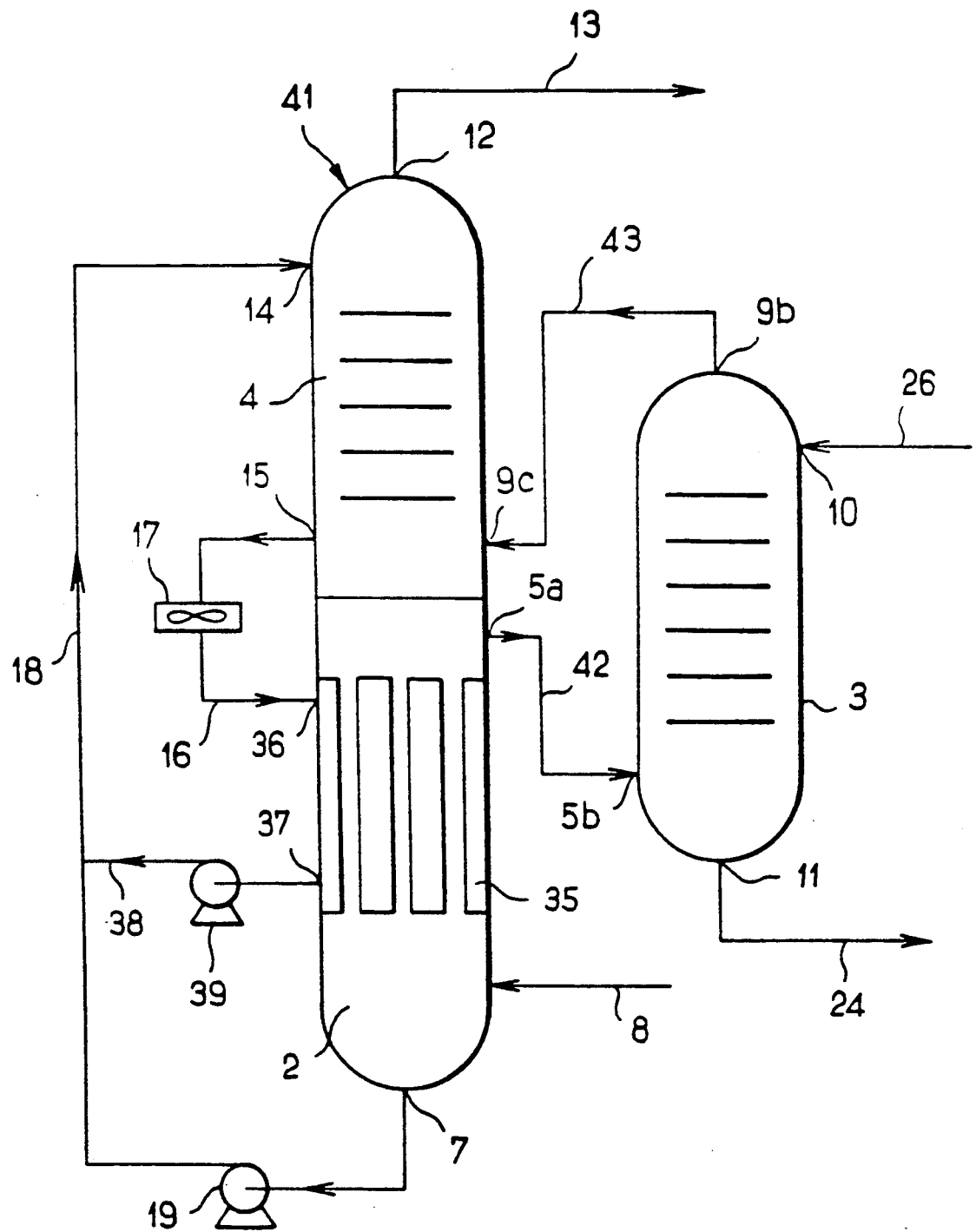

The device shown in FIG. 3, and respectively in FIG. 4, differs from the device shown in FIG. 1, and respectively in FIG. 2, only in that the scrubbing section 3 forms an independent scrubbing column and that the cooling section 2 and the rehydration section 4 are two superposed sections of the same single column 41, the gas exit 5a of the cooling section 2 being connected by a conduit 42 to the gas entry 5b of the scrubbing column 3 and the gas exit 9b of the said column 3 being connected by a conduit 43 to the gas entry 9c of the rehyration section 4. The other components of the device of FIG. 3, and respectively of the device of FIG. 4, are identical with the components bearing the same references of the device of FIG. 1, and respectively of the device of FIG. 2. In particular, the liquid entry 10 and exit 11 of the scrubbing column 3 are connected, by conduits 26 and 24 respectively, to the liquid exit 23 and entry 22 of a regeneration column 20, not shown and identical with that shown diagrammatically in FIG. 1.

The operation of the device shown in any one of FIGS. 1 to 4 may be outlined as follows.

The gas to be treated, which contains the $H_2S$ to be extracted and a large quantity of water vapour, is delivered by the conduit 8 to the cooling section 2 of the column 1 (FIGS. 1 and 2) or of the column 41 (FIGS. 3 and 4) and in the said section meets, either directly (FIGS. 1 and 3) or indirectly (FIGS. 2 and 4) a stream of water delivered by the conduit 16 originating from the rehydration section 4 and cooled to a suitable temperature in the heat exchanger 17 mounted in the conduit 16 and operating as a cooler. The temperature of the water stream entering the cooling section 2 is adjusted, by virtue of the cooler 17, so as to condense virtually all the water contained in the gas delivered by the conduit 8 and so as to take the said gas to a temperature corresponding substantially to that of the scrubbing, which results in obtaining, at the bottom of section 2, a water stream heated by the sensible heat given to it by the gas during its cooling, to which is added the latent heat of the condensed water.

The gas, cooled and substantially rid of its water, enters, via the passage 5 (FIGS. 1 and 2) or via the conduit 42 and the passage 5b (FIGS. 3 and 4), the scrubbing section or column 3, in which the said gas is subjected to a countercurrent scrubbing using the absorbent liquid injected into the said section or column 3 via the entry 10. The absorbent liquid charged with $H_2S$ is drawn off from the section or column 3 via the exit 11 and is then directed by the conduit 24, while being heated in the exchanger 25, into the regeneration column 20, to be regenerated by reboiling therein, the regenerated absorbent liquid being recycled to the entry 10 of the section or column 3 by the conduit 26. An acidic gas stream containing $H_2S$, which may be sent, for example, to a Claus sulphur plant, is removed by the conduit 33 of the condenser 32 of the regeneration column.

The gas purified by scrubbing in the section or column 3 enters, via the gas passage 9 (FIGS. 1 and 3) or via the conduit 43 and the passage 9c, the rehydration section 4 of column 1 (FIGS. 1 and 3) or of column 41 (FIGS. 3 and 4), in which it meets counter-currentwise an excess of water injected through the entry 14 for the liquids from the rehydration section, the said water being delivered by the conduit 18 at a temperature higher than that of the gas entering the said section 4 and sufficiently high to remove, through the exit 12 of the rehydration section 4 and the conduit 13, a rehydrated purified gas which contains a quantity of water corresponding to a mass flow rate of water substantially equal to the mass flow rate of the water present in the gas to be treated before the latter is cooled. The water not employed for the rehydration of the purified gas leaves the section 4 by the exit 15, the said water being returned to the cooling section 2 by the conduit 16 and at a temperature which is adjusted by the cooler 17.

A continuous and controlled water circulation is therefore established in a closed circuit between the section 2 for cooling the gas to be treated and the section 4 for rehydrating the purified gas, so as to transfer continuously to the purified gas a quantity of water which is substantially equal to that formed by condensation of the water vapour contained in the gas to be treated, while short-circuiting the scrubbing section or column 3.

The adjustment of the temperature of the water injected by the conduit 18 into the rehydration section 4 can be carried out, as is the case with the device of FIG. 1 or of FIG. 3, by adjusting the temperature of the water injected into the cooling section 2 via the conduit 16, by controlling the cooler 17 so as to obtain at the exit 7 of the cooling section 2 a stream of water which has the desired elevated temperature for its injection into the rehydration section 4 via the conduit 18.

The temperature of the water injected via the conduit 18 into the rehydration section 4 can also be adjusted to the appropriate value, as is possible with the device of FIG. 2 or of FIG. 4, by controlling the relative flow rates of the water streams at different temperatures originating, on the one hand, from the cooling system 35 and, on the other hand, from the bottom 7 of the cooling section 2 (condensed water)

Figure 5:
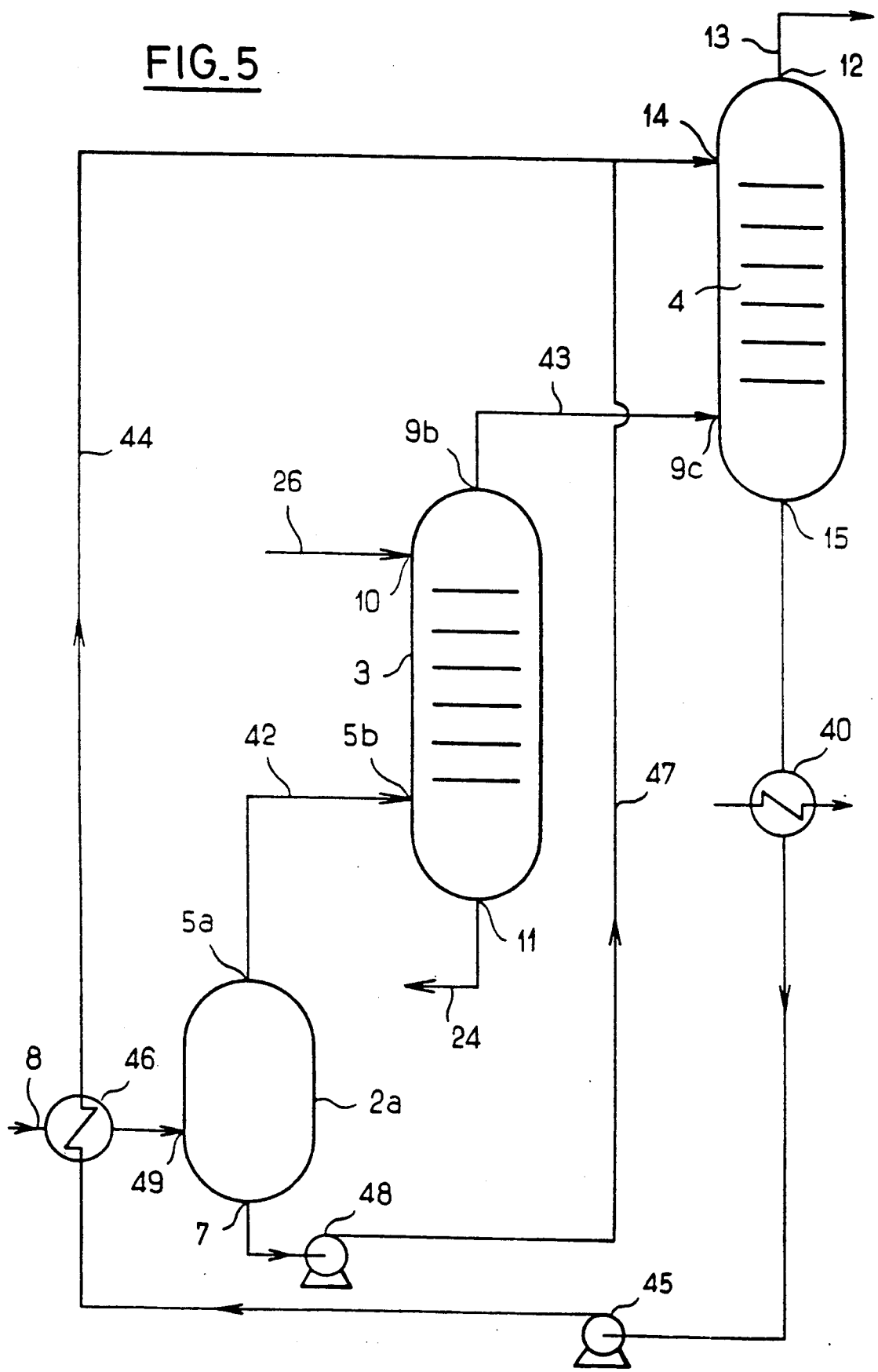
FIG. 5 shows a third device according to the invention, comprising three separate units for cooling, scrubbing and rehydration.

The device shown in FIG. 5 comprises a condensation flask 2a, a scrubbing column 3 and a rehydration column 4, the said columns being separate from each other and each being provided with trays for gas/liquid contact. The condensation flask 2a has an overhead exit 5a for the gases and at the bottom an exit 7 for the liquids and, emerging into its lower part, a delivery conduit 8 for gas to be treated, in which the hot circuit of an indirect heat exchanger 46 is mounted. The scrubbing column 3 has a gas exit 9b overhead, an entry 10 for the regenerated absorbent liquid in its upper part, a gas entry 5b in its lower part and an exit 11 for the absorbent liquid charged with $H_2S$ at the bottom The rehydration column 4 has an overhead gas exit 12, extended by a gas removal conduit 13, a liquid entry 14 in its upper part, a gas entry 9c in its lower part and a liquid exit 15 at the bottom. The gas exit 5a of the flask 2a is connected to the gas entry 5b of the column 3 by a conduit 42 and the gas exit 9b of the said column 3 is connected to the gas entry 9c of the column 4 by a conduit 43. A conduit 44, forming a water circuit, is connected at one of its ends to the liquid exit 15 of the rehydration column 4 and at its other end to the liquid entry 14 of the said column 4. The cold circuit of the heat exchanger 46 is mounted in the conduit 44, the said conduit 44 being also equipped, on the one hand, with a pump 45, which is arranged upstream of the exchanger 46 and whose delivery is directed towards the said exchanger and consequently towards the entry 14 of the column 4 and, on the other hand, with an indirect heat exchanger 40 arranged upstream of the pump 45. In addition, the exit 7 at the bottom of the flask 2a is connected to the conduit 44, downstream of the heat exchanger 46, by a conduit 47 in which there is mounted a pump 48 whose delivery is directed towards the conduit 44. Moreover, as in the case for the devices of FIGS. 1 to 4, the liquid entry 10 and exit 11 of the scrubbing column 3 are connected, by the conduits 26 and 24 respectively, to the liquid exit 23 and entry 22 of a regeneration column 20, not shown and identical with that of FIG. 1.

The operation of the device shown in FIG. 5 is comparable with that of the devices shown diagrammatically in FIGS. 1 to 4.

The gas to be treated, which contains the $H_2S$ to be removed and a large quantity of water vapour, is delivered by the conduit 8 and passes through the indirect heat exchanger 46 before entering the condensation flask 2a. A stream of water travels continuously in the rehydration column 4 and then in the conduit 44, from the liquid exit 15 of the said column 4, to return to the column 4 via the entry 14 of the latter, after having passed through the heat exchanger 46. In this heat exchanger 46 the gas to be treated is cooled to the appropriate temperature below the dew point of the water which it contains by transferring its heat to the colder water stream carried by the conduit 14 and the said water stream is raised to a temperature above the said dew point. In the flask 2a, the cooled gas separates from the water which has condensed while the gas to be treated passed through the heat exchanger 46.

The cooled gas, substantially rid of its water leaves the flask 2a through the gas exit 5a and, after passing through the conduit 42, enters, through the gas entry 5b, the scrubbing column 3, in which the said gas is subjected to countercurrent scrubbing by the absorbent liquid injected into the said column 3 through the entry 10. The absorbent liquid charged with $H_2S$ is drawn off from the column 3 via the exit 11 and is then directed by the conduit 24, while being heated in the exchanger 25, into the regeneration column 20, to be regenerated therein by reboiling, the regenerated absorbent liquid being recycled to the entry 10 of the column 3 by the conduit 26. Stream of acidic gas containing $H_2S$ is removed via the conduit 33 of the condenser 32 of the regeneration column, the said stream being, for example, conveyer to a Claus sulphur plant.

The gas rid of $H_2S$ by scrubbing in the column 3 leaves the said column through the gas exit 9b and, after passing through the conduit 43, enters, through the gas entry 9c, the rehydration column 4, in which it meets countercurrentwise an excess of water injected through the liquid entry 14 of the rehydration column 4. This water is delivered by the conduit 44 at a temperature which is higher than that of the gas entering the said column 4 through the gas entry 9c, the said temperature being sufficiently elevated for removing, through the exit 12 of the column 4 and the conduit 13, a rehydrated purified gas containing a quantity of water corresponding to a mass flow rate of water which is substantially equal to the mass flow rate of the water present in the gas to be treated, before the latter is cooled. The water not employed for rehydrating the purified gas leaves the column 4 through the exit 15, the said water being returned to the column 4 by the conduit 44, as shown previously, after having been first of all cooled in the indirect heat exchanger 40 and then heated in the heat exchanger 46 and after having had added to it, via the conduit 47, the required quantity of condensed water taken from the flask 2a through the liquid exit 7.

The adjustment of the temperature of the water injected via the conduit 44 into the rehydration column 4 is carried out by controlling the flow rates of water in conduits 44 and 47 by regulation of the pumps 45 and 48 which are mounted in the said conduits This application also results in transferring continuously to the purified gas a quantity of water which is substantially equal to that formed by condensation of the water vapour contained in the gas to be treated, this being done without passing this water through the scrubbing column 3.

To supplement the above description, two concrete examples of application of the process according to the invention are given below by way of illustration and without any limitation being implied.

EXAMPLE 1

A residual gas containing 0.35% of $H_2S$, 1.65% of CO, 25% of $CO_2$, 29% of water vapour and 44% of nitrogen, by volume, was treated by operating in a device similar to that shown in FIG. 1, the said gas resulting from the hydrogenation and hydrolysis of a residual gas from a Claus sulphur plant.

In the device employed, each of the cooling 2, scrubbing 3 and rehydration 4 sections of the column 1 contained 10 trays for gas/liquid contact and the regeneration column 20 contained 20 of these.

The absorbent liquid employed in the scrubbing section 3 consisted of a 4N aqueous solution of methyldiethanolamine (abbreviated to MDEA), a selective absorbent for $H_2S$.

The gas to be treated was delivered to the cooling section 2 at a flow rate of 160,000 $Nm^3/h$, a temperature of 110° C. and an absolute pressure of approximately 1.3 bars and met countercurrentwise in the said cooling section 2 a stream of water injected through the liquid entry 6 of this section at a flow rate of 450 $m^3/h$ and a temperature of 15° C. On contact with the stream of water injected through the entry 6 of the cooling section 2, virtually all of the water contained in the gas to be treated condensed and mixed with the said stream producine, at the bottom of the said section 2, water at a temperature of 93° C. and, at the head of this section, a cooled gas at a temperature of 20° C. and substantially free from water.

The cooled gas entered, through the passage 5, the scrubbing section 3 at a temperature of 20° C. and met countercurrentwise, in this section 3, the regenerated absorbent liquid injected through the entry 10 at a flow rate of 800 $m^3/h$ and a temperature of 20° C., the said absorbent liquid being delivered from the regeneration column 20 by the conduit 26. The absorbent liquid charged with $H_2S$ left the scrubbing section 3 by the exit 11, at a flow rate of 800 $m^3/h$, and was lead to the regeneration column 20, in which, for the purpose of regeneration, it was raised at the bottom of this column 20 to temperature of approximately 125° C. by means of steam circulating in the pipework 30 of the reboiler. The regenerated absorbent liquid was returned to the entry 10 of the scrubbing section 3 by the conduit 26.

The purified gas entered, through the passage 9, the rehydration section 4 at a temperature of 20° C. and met countercurrentwise a stream of water injected into this section through the entry 14 at a temperature of 93° C. and a flow rate of 500 m$^3$/h, the said stream of water being delivered by the conduit 18, by the action of pump 19, from the bottom 7 of the cooling section 2. A rehydrated purified gas containing less than 100 v.p.m. (volumes per million) of H$_2$S and exhibiting a water dew point of 70° C. was removed at a flow rate of 150,000 Nm$^3$/h by the conduit 13 extending the overhead gas exit 12 of the rehydration section 4, the said temperature being very close to the dew point of the water in the gas to be treated delivered by the conduit 8. The water not employed in the rehydration section 4 left the said section through the exit 15 at a flow rate of 450 m$^3$/h and a temperature of 23° C. This water was lead, via the conduit 16, to the entry 6 of the cooling section 2 after having been cooled to 15° C. by passing through the cooler mounted in the conduit 16.

The rehydrated purified gas leaving through the discharge conduit 13 removed continuously a quantity of water vapour corresponding to a mass flow rate of water substantially equal to the mass flow rate of the water condensed in the section 2 by cooling the gas to be treated. The rehydrated purified gas then underwent an incineration to convert the last traces of H$_2$S which it contained into SO$_2$, and was then discharged into the atmosphere.

EXAMPLE 2

A residual gas having the same composition as the gas treated in Example 1 was treated by operating in a device similar to that shown in FIG. 2, this residual gas also originating from the hydrogenation and hydrolysis of a residual gas of a Claus sulphur plant.

In the device employed, the cooling section 2 was equipped with an indirect heat exchange apparatus 35, the washing 3 and rehydration 4 sections contained 10 and 6 trays for gas/liquid contact respectively, and the regeneration column 20 contained 20 of these.

The absorbent liquid employed was identical with that employed in Example 1.

The gas to be treated was delivered to the cooling section 2 at a flow rate of 160,000 Nm$^3$/h, a temperature of 120° C. and an absolute pressure of 1.3 bars and was cooled, in the said section 2, to a temperature of 50° C. by indirect heat exchange with the stream of water injected into the heat exchange apparatus 35, through the entry 36 of the latter, at a flow rate of 800 m$^3$/h and a temperature of 45° C. On indirect contact with the stream of water injected through the entry 36 of the exchanger apparatus 35, virtually all the water contained in the gas to be treated condensed, producine, at the bottom of the section 2, a stream of condensed water at a temperature of 90° C. and, at the head of this section, a cooled gas at a temperature of 50° C. and substantially free from water, a stream of hot water at a temperature of 90° C. being also obtained at the exit 37 of the exchanger apparatus 35.

The cooled gas entered, through the passage 5, the scrubbing section 3 at a temperature of 50° C. and met countercurrentwise, in this section, the regenerated absorbent liquid injected through the entry 10 at a flow rate of 1,300 m$^3$/h and a temperature of 45° C., the said absorbent liquid being delivered from the regeneration column 20 by the conduit 26. The absorbent liquid charged with H$_2$S left the scrubbing section 3 through the exit 11, at a flow rate of 1,300 m$^3$/h, and was lead to the regeneration column 20 in which, for the purpose of regeneration, it was heated at the bottom of the said column to a temperature of approximately 125° C. by means of steam circulating in the pipework 30 of the reboiler 29. The regenerated absorbent liquid who returned to the entry 10 of the scrubbing section 3 by the conduit 26.

The purified gas entered, through the passage 9, the rehydration section 4 at a temperature of 45° C. and met countercurrentwise a stream of water injected into this section through the entry 14 at a temperature of 90° C. and a flow rate of 840 m$^3$/h, the said stream being formed by the merging, on the one hand, of the stream of water flowing at a temperature of 90° C. through the exit 36 of the exchanger apparatus 35 and pumped, by the pump 39, in the conduit 38 at a flow rate of 800 m$^3$/h and, on the other hand, of a stream of condensed water drawn off, at a temperature of 90° C., through the exit 7 of the section 2 and pumped, by the pump 19, in the conduit 18, upstream of the conduit 38, at a flow rate of 40 m$^3$/h.

A rehydrated purified gas containing less than 200 v.p.m. of H$_2$S and exhibiting a water dew point of 70° C. was removed at a flow rate of 150,000 Nm$^3$/h via the conduit 13 extending the overhead gas exit 12 of the rehydration section 4, the said temperature being very close to the water dew point of the gas to be treated delivered by the conduit 8. The water not employed in the rehydration section 4 left the said section through the exit 15 at a flow rate of 800 m$^3$/h and a temperature of 60° C. This water was lead by the conduit 16 to the entry 36 of the exchanger apparatus 35 after having been cooled to 45° C. by passing through the air cooler 17 mounted in the conduit 16.

The rehydrated purified gas leaving by the conduit 13 removed continuously a quantity of water vapour corresponding to a mass flow rate of water substantially equal to the mass flow rate of the water condensed in the section 2 by cooling the gas to be treated. The rehydrated purified gas then underwent an incineration, and was then discharged into the atmosphere.

We claim:

1. A process for the removal of H$_2$S present at low concentration in a gas also containing 5 to 60% by volume of water vapor, which comprises the steps of:
   a) cooling the H$_2$S-containing gas to a temperature below the dew point of the water, thereby condensing the water vapor, separating substantially all of the water and forming a cooled H$_2$S-containing gas, substantially free of the water,
   b) scrubbing the cooled H$_2$S-containing gas, substantially free of the water, with a H$_2$S-absorbent liquid forming (i) an absorbent liquid charged with H$_2$S and (ii) a purified gas, substantially free of water and H$_2$S, and
   c) contacting the (ii) purified gas with heated water, said water produced from step a), the temperature of the heated water being such that the purified gas is rehydrated, so that the water content as water vapor corresponds to a mass flow rate of water substantially equal to the mass flow rate of the waste present in the H$_2$S-containing gas before cooling said gas, and wherein said water produced during step a) circulates in a closed circuit and is cooled to a temperature sufficient for cooling the H$_2$S-containing gas and condensing the water vapor in step a) by direct or indirect heat exchange, after contacting and rehydrating the (ii) purified gas.

2. The process of claim 1, wherein the heated water contacting and rehydrating the purified gas in step c) comprises other waste waters, so that the water content as water vapor corresponds to a mass flow rate of water substantially equal to the mass flow rate of the water present in the $H_2S$-containing gas before cooling said gas and of the added waste waters.

3. The process of claim 1, wherein the rehydrated purified gas has a water dew point substantially equal to the water dew point of the $H_2S$-containing gas before cooling of said gas in step a).

4. The process of claim 1, wherein the $H_2S$-containing gas has a $H_2S$ content ranging from 10 v.p.m. to 10% by volume.

5. The process of claim 4, wherein the $H_2S$-containing gas is a residual gas produced by hydrogenation and hydrolysis of the residual gas from a sulphur plant, wherein all the sulphur compounds are formed into $H_2S$.

6. The process of claim 1, wherein the $H_2S$-containing gas also contains $CO_2$.

7. The process of claim 1, wherein the scrubbing of the cooled $H_2S$-containing gas with the $H_2S$-absorbent liquid is performed at a temperature below 70° C.

8. The process of claim 1, wherein the scrubbing of the cooled $H_2S$-containing gas with the $H_2S$-absorbent liquid is performed at a temperature between 5° C. and 55° C.

9. The process of claim 1, wherein the absorbent liquid charged with $H_2S$, is regenerated and reemployed for scrubbing of the cooled $H_2S$-containing gas in step b).

10. The process of claim 9, wherein the $H_2S$-absorbent liquid selectively absorbs $H_2S$.

11. The process of claim 10, wherein the $H_2S$-absorbent liquid selectively absorbing $H_2S$, is an aqueous solution of an amine selected from the group consisting of alkanolamines and sterically-hindered amines.

12. The process of claim 11, wherein the alkanolamines are selected from the group consisting of methyl-diethanolamine, triethanolamine and diisopropanol-amine.

13. The process of claim 11, wherein the amine concentration of said aqueous solution is between 1N and 8N.

14. The process of claim 11, wherein the amine concentration of said aqueous solution is between 3N and 6N.

15. The process of claim 1, wherein substantially all of said condensed water from step a) contacts and rehydrates the purified gas in step c).

16. An apparatus for removing $H_2S$ present at low concentration in a gas also containing 5 to 60% by volume of water vapor, which comprises:
   a) means for cooling the $H_2S$-containing gas and for condensing the water vapor by cooling to a temperature below the dew point of the water, wherein substantially all of the water is condensed and separated, thereby forming a cooled $H_2S$-containing gas, substantially free of the water,
   b) means for scrubbing the cooled $H_2S$-containing gas with a $H_2S$-absorbent liquid so that (i) an absorbent liquid charged with $H_2S$ is formed,
   c) means for contacting the purified gas with heated condensed water from a), said water heated by heating means, wherein the heated condensed water is at a temperature for rehydrating the purified gas, so that the water content as water vapor corresponds to a mass flow rate of water substantially equal to the mass flow rate of the water present in the $H_2S$-containing gas, before cooling said gas and
   d) circulating means for connecting the contacting means and the cooling means, so that the water condensed and separated by the cooling means is delivered to the contacting means for rehydrating the purified gas, then recirculated to the cooling means of step a).

17. The apparatus of claim 16, wherein the cooling means and the contacting means form two superposed an independent sections of a single column 18. The apparatus of claim 16, wherein the cooling means, scrubbing means and contacting means form three supposed sections of a single column, forming a lower cooling column, an intermediate scrubbing column and an upper rehydration column, so that the gas exit of the cooling column and the gas entry of the scrubbing column form a passage for the gases and the gas exit of the scrubbing column and the gas entry of the rehydration column form a passage for the gases.

19. The apparatus of claim 16, wherein the means for cooling the $H_2S$-containing gas and for condensing the water vapor by cooling to a temperature below the dew point of water, comprises a cooling column having, in its upper part, an exit for the cooled $H_2S$-containing gas, substantially free of the water, and an entry for liquids in its upper part, and in its lower part, a conduit for delivering the $H_2S$-containing gas and an exit for separating the condensed water.

20. The apparatus of claim 19, wherein the cooling column is mounted in a rehydration water circuit by the entry for the liquids in its upper part, and the exit for separating the condensed water in its lower part.

21. The apparatus of claim 20, wherein the cooling column is equipped with an indirect heat exchanger apparatus mounted between the entry and the exit of the rehydration water circuit.

22. The apparatus of claim 16, wherein the means for scrubbing the cooled $H_2S$-containing gas with the $H_2S$-absorbent liquid comprises a scrubbing column having an entry for a regenerated $H_2S$-absorbent liquid in its upper part and an exit for the absorbent liquid charged with $H_2S$ in its lower part, and an entry for the cooled $H_2S$-containing gas in its lower part and an exit for the purified gas in its upper part.

23. The apparatus of claim 16, wherein the means for contacting the purified gas with the heated water, comprises a rehydration column mounted in a rehydration water circuit between said contacting zone of c) and the 24. The apparatus of claim 16, which further comprises means for regenerating and reemploying the absorbent liquid charged with $H_2S$, so that the $H_2S$-absorbent liquid is regenerated and reemployed for the scrubbing of the cooled $H_2S$-containing gas.

25. The apparatus of claims 24, wherein the means for regenerating and reemploying the absorbent liquid charged with $H_2S$, so that the $H_2S$-absorbent liquid is regenerated and reemployed for the scrubbing of the cooled $H_2S$-containing gas, comprises a regeneration column, having an overhead exit for an acidic gas, an entry for the absorbent liquid charged with $H_2S$ in its upper part and an exit for the regenerated $H_2S$-absorbent liquid at its bottom.

26. The apparatus of claim 25, further comprising means for connecting the regeneration column in its lower part to a reboiler heated by indirect heat exchange by circulating steam.

27. The apparatus of claim 26, further comprising means for connecting the overhead exit of the regeneration column to a condenser, so that a conduit in the upper part of the condenser removes acidic gas and a conduit in the lower part of the condenser circulates condensates to the upper part of the regeneration column.

28. The apparatus of claim 25, wherein the means for scrubbing the cooled $H_2S$-containing gas with the $H_2S$-absorbent liquid, comprises a scrubbing column having an entry for a regenerated $H_2S$-absorbent liquid in its upper part and an exit for the absorbent liquid charged with $H_2S$ in its lower part, and an entry for the cooled $H_2S$-containing gas in its lower part and an exit for the purified gas in its upper part.

29. The apparatus of claim 28, wherein the regeneration column and the scrubbing column are connected, so that the entry of the regeneration column is connected to the exit of the scrubbing column by a conduit, on which is mounted a cold circuit of an indirect heat exchanger, and the exit in the lower part of the regeneration column is connected to the entry of the scrubbing column by a conduit on which a hot circuit of the indirect heat exchanger is mounted.

30. The apparatus of claim 16, wherein the means for contacting the purified gas are additionally waste waters heated to a temperature for rehydrating the purified gas, so that the heated water content as water vapor corresponds to a mass flow rate of water substantially equal to the mass flow rate of the water present in the $H_2S$ containing gas before cooling said gas and of the added waste waters from other sources.

31. The apparatus of claim 16, wherein substantially all the water condensed and separated by the cooling means is delivered to the contacting means for rehydrating the purified gas, then recirculated to the cooling means of step a).

32. An apparatus for removing $H_2S$ present at low concentration in a gas also containing 5 to 60% by volume of water vapor, which comprises:
  a) means for cooling the $H_2S$-containing gas and for condensing the water vapor by cooling to a temperature below the dew point of the water, wherein substantially all of the water is condensed and separated, thereby forming a cooled $H_2S$-containing gas, substantially free of the water, said cooling means provided with a delivery conduit for the $H_2S$-containing gas in its lower part and having an exit for the gas in its upper part and an exit for the condensed water at the bottom,
  b) means for scrubbing the cooled $H_2S$-containing gas with a $H_2S$-absorbent liquid so that (i) an absorbent liquid charged with $H_2S$ is formed and (ii) a purified gas, substantially free of the water and $H_2S$ is formed, which has an overhead exit for (ii) the purified gas, an entry for the $H_2S$-absorbent liquid in it upper part and, in its lower part, an exit for (i) the absorbent liquid charged with $H_2S$ and a gas entry in its lower part for the cooled gas, said gas entry being connected to the gas exit of the cooling means,
  c) means for contacting the purified gas with heated condensed water from step a), said water heated by heating means, wherein the heated condensed water is at a temperature for rehydrating the purified gas, and so that the water content as water vapor corresponds to a mass flow rate of water substantially equal to the mass flow rate of the water present in the $H_2S$-containing gas, before cooling said gas, which has an overhead exit for the rehydrated purified gas, an entry in it upper part for the condensed water from the cooling means and, in its lower part, an exit for the rehydration water for cooling the $H_2S$-containing gas, and a gas entry in its lower part being in communication with the gas exit of the scrubbing means,
  d) means for regenerating and reemploying (i) the absorbent liquid charged with $H_2S$, so that the $H_2S$-absorbent liquid is regenerated and reemployed for the scrubbing of the cooled $H_2S$-containing gas, having an overhead exit for an acidic gas, an entry for (i) the absorbent liquid charged with $H_2S$ in its upper part and an exit for the regenerated $H_2S$-absorbent liquid at its bottom, and means for connecting the overhead exit of the regenerating means to a condenser, so that a conduit in the upper part of the condenser removes acidic gas and a conduit in the lower part of the condenser circulates the condensates to the upper part of the regenerating means, and means for connecting the regenerating means and the scrubbing means, so that the entry in the upper part of the regenerating means is connected to the exit in the lower part of the scrubbing means by a conduit on which is mounted a cold circuit of an indirect heat exchanger, and the exit in the lower part of the regenerating means is connected to the entry in the upper part of the scrubbing means by a conduit on which a hot circuit of the indirect heat exchanger is mounted and
  e) circulating means for connecting the contacting means and the cooling means, so that the water condensed and separated by the cooling means is delivered to the contacting means for rehydrating the purified gas, said water is then recirculated to the cooling means.

* * * * *